United States Patent [19]
Brawner et al.

[11] 4,165,713
[45] Aug. 28, 1979

[54] RETRACTABLE LEASH

[75] Inventors: William H. Brawner, El Cajon; James O. Umphries, Victorville, both of Calif.

[73] Assignee: H.P.G. IV, Inc., El Cajon, Calif.

[21] Appl. No.: 852,502

[22] Filed: Nov. 17, 1977

[51] Int. Cl.² ............................................. A01K 27/00
[52] U.S. Cl. ...................................... 119/109; 16/126
[58] Field of Search ..................... 119/109; 242/107.3; 16/125-127

[56] References Cited
U.S. PATENT DOCUMENTS

| 2,250,171 | 7/1941 | Wilkins | 119/109 |
|---|---|---|---|
| 2,833,250 | 5/1958 | Beebe | 119/109 |
| 2,919,676 | 1/1960 | Schneider | 119/109 |
| 3,259,086 | 7/1966 | Stein | 16/126 |
| 3,318,288 | 5/1967 | Mullritter | 119/109 |
| 3,477,410 | 11/1969 | Lettieri | 119/109 |
| 4,018,189 | 4/1977 | Umphries | 119/109 |

Primary Examiner—Jay N. Eskovitz
Attorney, Agent, or Firm—Brown & Martin

[57] ABSTRACT

A retractable leash for dogs and like pets includes a housing having a generally cylindrical cavity in which a rotatable reel is mounted and spring biased in one direction with a flexible leash member wound on the reel and extending externally of the housing and connected to a handle. The handle is defined by a resilient loop which encircles and resiliently biases into engagement with the housing for providing a compact arrangement when the leash is not in use.

10 Claims, 3 Drawing Figures

RETRACTABLE LEASH

BACKGROUND OF THE INVENTION

The present invention relates to animal leashes and pertains particularly to a retractable leash.

Many households have animals, such as dogs and cats for pets. Such animals are frequently permitted out of doors for exercise and play and the like. Most cities, however, have leash laws requiring such animals to be on a leash at all times, while on public property.

Such animals are normally kept around the house and yard without a leash since such leashes tend to catch and snag on objects around the yard or house. It is therefore necessary to attach and remove a leash each time the pet is taken for a walk.

One approach to the elimination of the problem of constanting attaching and detaching a leash has been the provision of retractable leashes. Such retractable leashes have been developed for this purpose. Such leashes however have numerous drawbacks. Among the drawbacks of such prior art devices is the absence of suitable attaching means for attaching the leash assembly to a collar such that it provides a compact arrangement against the collar.

Another drawback to the prior art devices is that they have a handle for the owner to grasp which is not retractable into the housing and thus provides a rather large object hanging from the collar of the pet.

A still further problem with such devices is that the handles are normally of a hard material and thus if accidentially released, they injure the pet.

It is therefore desirable that a retractable leash assembly be available which is compact and convenient to use and has a non-injurous, easily storeable handle.

SUMMARY AND OBJECTS OF THE INVENTION

It is accordingly the primary object of the present invention to overcome the above problems of the prior art.

Another object of the present invention is to provide a retractable leash assembly wherein fastening means are provided for fastening the leash assembly close in to the collar of the pet.

A further object of the present invention is to provide a leash assembly having a handle which is soft and pliable to avoid injury to the pet.

A still further object of the invention is to provide a leash assembly having a handle means which is easily and conveniently stowable on the assembly to avoid snagging on external objects.

In accordance with the primary aspect of the present invention, a retractable leash assembly includes a housing having a flexible leash member wound on a spring biased reel inside the housing, compact fastening means on the housing, and a soft handle that is stowable in a compact arrangement with the housing.

BRIEF DESCRIPTION OF THE DRAWING

The above and other objects and advantages of the present invention will become apparent from the following description when read in conjunction with the drawings wherein.

DETAILED DESCRIPTION OF THE PREFERRED EMBODIMENT

Figure 1:
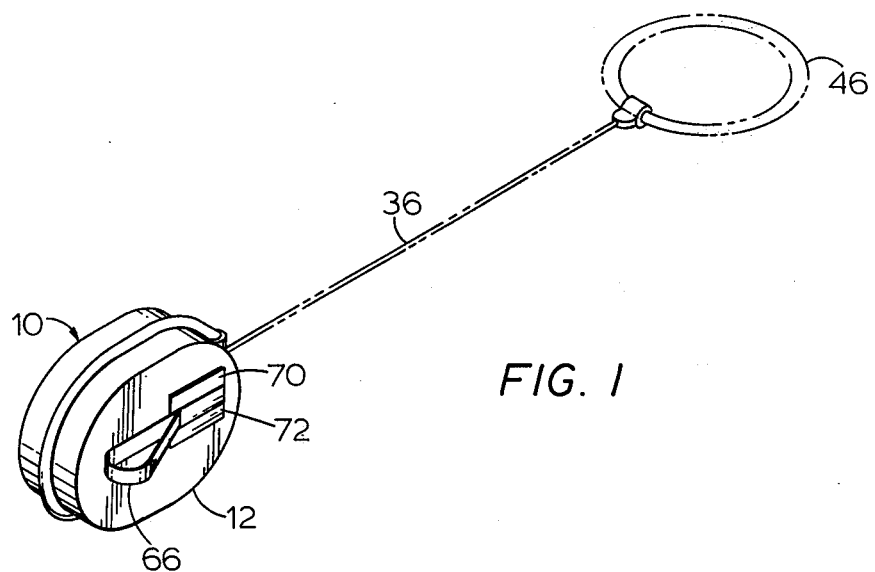
FIG. 1 is a perspective view of the leash unit.

Turning now to the drawings, there is illustrated a leash assembly in accordance with the present invention designated generally by the numeral 10. This leash assembly comprises a housing of a general oval outer configuration defined by first and second generally flat oval side walls 12 and 14 connected together by a peripheral wall 16 which is made integral with wall 12 and extends outwardly coaxially therefrom. The walls of the housing define an inner generally cylindrical reel and spring chamber 18. The wall 14 forms a detachable cover for the chamber of the housing and is detachably connected to the remaining portion of the housing by means of a plurality of lugs 20 which extend into a plurality of circumferentially spaced or disposed axially extending slots 22 formed in the peripheral walls 16. The lugs 20 extend into the arcuate slots 22 and includes a small ridge fitting or slipping into a small depression within the slots for a detent-like engagement and retention into position. The cover can usually be pried off the housing for exposing of the internal mechanism of the leash arrangement for repair or replacement of damaged parts. The housing assembly may be constructed of any suitable material such as a high impact plastic. Thus, it can be easily formed by injection molding.

Figure 3:
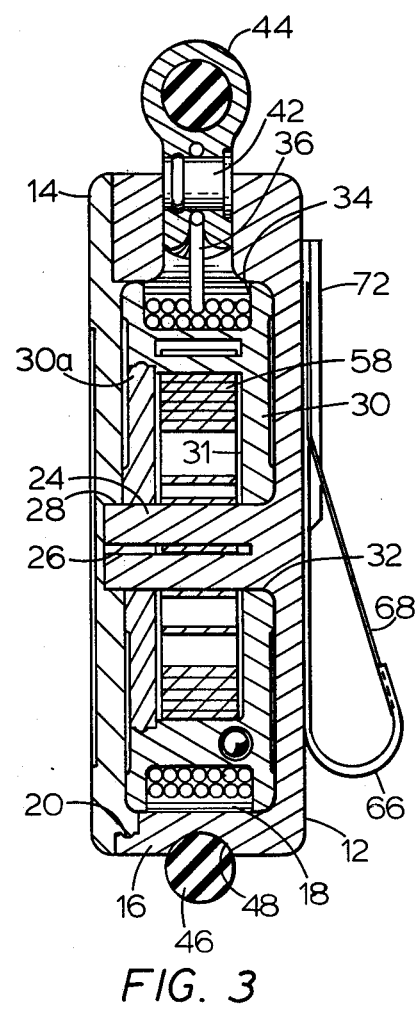
FIG. 3 is a sectional view taken on line 3—3 of FIG. 2.

A shaft 24 formed integral with the wall of the housing 12 and including a slit 26 extends coaxially of the chamber 18 of the housing. The end of the shaft 24 extends into a blind bore 28 in wall or cover 14. A reel or drum 30 is rotatably journalled by means of a bore 32 on the shaft 24. This reel or drum includes a sheave portion 34 for receiving a leash member 36 wound thereon in layers as shown in FIG. 3. This leash member may be any suitable flexible material, such as a woven cord or line made of any suitable materials such as a natural or synthetic fiber.

Figure 2:
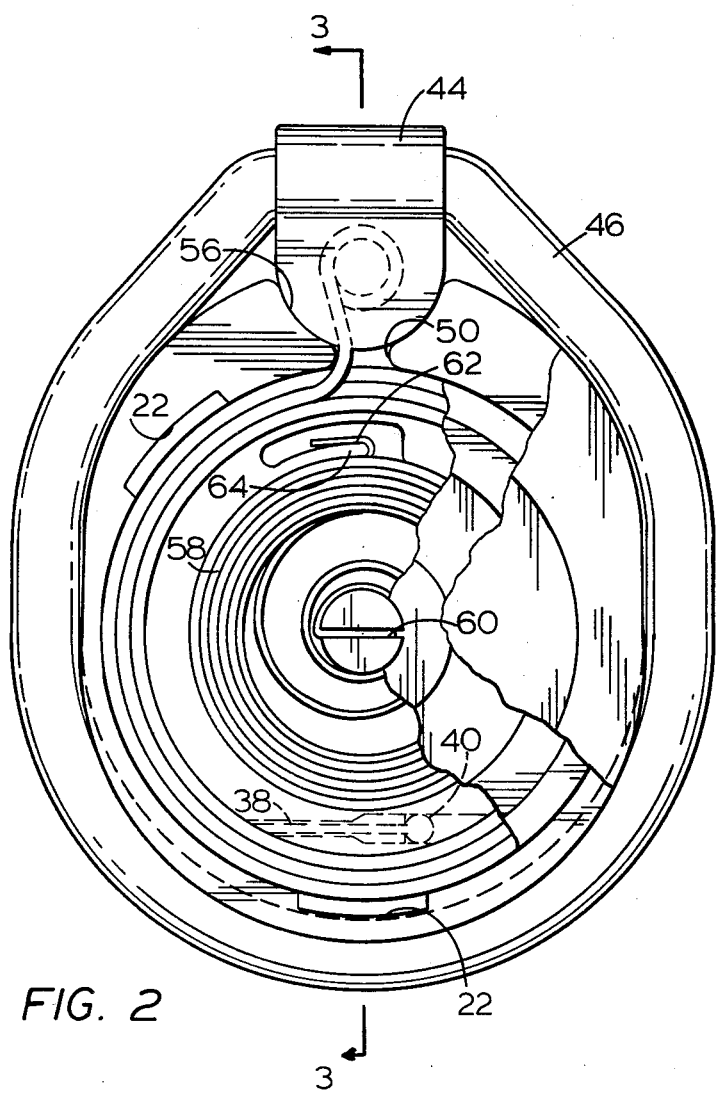
FIG. 2 is an enlarged side view of the unit with portions of the cover broken away to reveal the internal structure.

This leash member 36 is connected at its inner end to the drum or reel 30 by extention through a bore 38 and having a suitable retention member such as a ball or the like 40 connected to the end thereof. The outer end of the leash member 36 is connected by a loop around a pin 42 to a bracket or clamp 44 which in turn loops around a resilient handle 46. The handle 46 is defined by a loop or torous of a suitable elastic rubber or rubber-like material, such as urethane having a hardness of 80 shore. The handle is constructed of a diameter such that it must be stretched slightly to fit over the housing as shown in FIGS. 1 through 3. The peripheral wall 16 is provided with a semi-circular groove 48 extending partially around the periphery of the wall for receiving the handle 46. In this configuration as shown clearly in FIGS. 2 and 3, the handle is fit snugly around the housing fitting within the groove 48 and provides a snug compact arrangement. In this configuration, the handle does not fall free and cannot snag or catch on external objects.

With this arrangement, the leash assembly can be left on the animals collar at all times and the handle merely pulled from around the housing when it is desired to control the animal by means of the leash. The leash is extended from the housing through an opening 50 in the housing wherein the leash member is then connected by bracket or clamp 44 to the handle 46. A semi-cylindrical recess 56 is provided within the peripheral wall of the housing for receiving semi-cylindrical end portion of the attaching clamp 44. This recess in combination with groove 48 securely retains the handle on the housing.

The reel 30 is biased by a coil spring 58 in a direction to wind the leash member 36 about the drum. The coil spring 58 is connected at an inner end 60 which fits into slot 26 to the fixed shaft 24 of the housing and is connected at an outer end by means of a hook 62 extending over a hook receiving edge 64 inside the reel. The spring 58 is disposed inside a generally cylindrical spring receiving chamber 31 of the reel 30. This chamber is closed by a cap 30a of the housing. This cap 30a fits snugly within a bore in the side of the reel and includes ridges at the outer periphery thereof extending into slots in the reel in a detent-like manner. The cover is then snapped into position within the reel for closing the spring cavity.

The handle 46 of the leash assembly can be removed from or about the housing and the leash extended as shown in phantom in FIG. 1. The leash assembly includes a clip as shown in FIGS. 1 and 3 comprising an inner hook member 66 and an outer spring member 68, each slidably mounted at the upper end thereof, as shown in FIG. 3, within a slot defined by a pair of spaced ridges 70 and 72 formed on the side wall of the housing. With this spring clip arrangement, the assembly can be quickly and easily attached and detached from the collar of an animal. The location of this spring clip on the side of the housing permits the attachment of the assembly such that it lays closely into the side of the animal's neck and collar. This minimizes the chance of the assembly snagging on external objects when it has been left on the collar.

The construction of the present invention provides a compact and simple arrangement which is easily and conveniently left attached to the collar of the animal or removed and carried, for example, in the pocket or purse if desired. The construction eliminates the prior art protruding handles and the like, which result in snagging on external objects.

It will be appreciated that the device can be constructed in any suitable size for any desired size animal. The leash member can have any suitable length or diameter suitable for the specific animal for which the device is constructed.

While the present invention has been illustrated and described by means of a specific embodiment, it is to be understood that numerous changes and modifications may be made therein without departing from the spirit and scope of the invention as defined in the appended claims.

We claim:

1. A retractable leash comprising:
   a housing having a pair of spaced apart generally flat side walls and a peripheral wall defining a central enclosable cylindrical cavity,
   a reel rotatably mounted within said cylindrical cavity,
   a coil spring fixed at one end to said housing and connected at the other end to said reel,
   a flexible leash member wound about said reel, having an inner end connected to said reel and an outer end extending externally of said housing, and
   a handle defined by a resilient loop connected to the outer end of said leash member, said handle adapted to encircle and snugly fit onto the outside of said peripheral wall of said housing when said leash member is retracted into said housing.

2. The leash of claim 1 wherein:
   said peripheral wall of said housing includes a groove extending partially therearound for receiving said handle.

3. The leash of claim 2 wherein:
   said handle is stretched to fit over the peripheral wall of the housing into said groove.

4. The leash of claim 1 including clip means secured to one side of said housing for releasably clipping said leash to a collar.

5. The leash of claim 2 wherein said housing includes a detachable cover for covering said cylindrical cavity,
   said cover including a plurality of lugs extending into slots in said housing and detent means defined by said lugs and slots for retaining said cover in position on said housing.

6. The retractable leash of claim 5 wherein said housing is of a generally oval configuration having an opening in one end thereof through which said leash member extends for connection to said handle, and
   said groove extending across the other end for receiving said handle.

7. The retractable leash of claim 6 comprising:
   clamp means connecting said handle and said leash member together,
   a semi-cylindrical recess formed in said housing at said opening, and
   said clamp means including a semi-cylindrical portion extending into said recess.

8. The leash of claim 3 wherein:
   said housing is constructed of a moldable plastic into a generally oval configuration defined by first and second generally flat parallel walls connected together by a peripheral wall, said peripheral wall being formed integrally with said first wall and including a plurality of arcuate slots disposed around the periphery thereof and said second wall defining a detachable cover and including a corresponding plurality of lugs extending into said slots for detachably securing said cover to said housing.

9. The leash of claim 8 wherein:
   said peripheral wall includes a groove across one end for receiving said handle, and an opening in the other end through which said leash member extends.

10. The leash of claim 9 including:
    a spring clip device detachably mounted on said first wall for detachably connecting said leash to a collar.

* * * * *